(12) United States Patent
Mongillo et al.

(10) Patent No.: US 10,801,325 B2
(45) Date of Patent: Oct. 13, 2020

(54) TURBINE BLADE WITH TIP VORTEX CONTROL AND TIP SHELF

(71) Applicant: United Technologies Corporation, Farmington, CT (US)

(72) Inventors: Dominic J. Mongillo, West Hartford, CT (US); Scott D. Lewis, Vernon, CT (US); Jeffrey T. Morton, Manchester, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 469 days.

(21) Appl. No.: 15/469,715

(22) Filed: Mar. 27, 2017

(65) Prior Publication Data

US 2018/0274368 A1 Sep. 27, 2018

(51) Int. Cl.
*F01D 5/18* (2006.01)
*F01D 5/14* (2006.01)
*F01D 5/20* (2006.01)

(52) U.S. Cl.
CPC ............... *F01D 5/141* (2013.01); *F01D 5/18* (2013.01); *F01D 5/187* (2013.01); *F01D 5/20* (2013.01); *F05D 2220/32* (2013.01); *F05D 2240/301* (2013.01); *F05D 2240/307* (2013.01); *F05D 2250/711* (2013.01); *F05D 2260/20* (2013.01); *Y02T 50/673* (2013.01); *Y02T 50/676* (2013.01)

(58) Field of Classification Search
CPC . F01D 5/141; F01D 5/187; F01D 5/20; F01D 5/18; Y02T 50/676; Y02T 50/673; F05D 2260/20; F05D 2240/307; F05D 2220/32; F05D 2240/301; F05D 2250/711
See application file for complete search history.

(56) References Cited

U.S. PATENT DOCUMENTS

| 2,488,991 | A | * | 11/1949 | Stalker | B64C 21/06 244/208 |
| 3,195,807 | A | * | 7/1965 | Sheets | F01D 5/141 415/220 |
| 4,431,376 | A | | 2/1984 | Lubenstein et al. | |
| 5,160,242 | A | | 11/1992 | Brown | |
| 5,480,285 | A | | 1/1996 | Patel et al. | |

(Continued)

OTHER PUBLICATIONS

"Cooling Effects of Dirt Purge Holes" document, published on May 2, 2016 at https://www.craftofscientificposters.com/design.html.*

(Continued)

*Primary Examiner* — Peter J Bertheaud
*Assistant Examiner* — Dnyanesh G Kasture
(74) *Attorney, Agent, or Firm* — Carlson, Gaskey & Olds, P.C.

(57) ABSTRACT

A blade for a gas turbine engine includes an airfoil which includes pressure and suction side surfaces joined at leading and trailing edges to provide an exterior airfoil surface. The airfoil extends from a 0% span position to a 100% span position at a tip. A mean chamber line is provided at the tip and extends from the leading edge to the trailing edge. The mean chamber line has a leading edge tangent line at the leading edge at the tip and a trailing edge tangent line at the trailing edge at the tip. The leading edge tangent line and the trailing edge tangent line intersect to provide a total camber angle in a range of −35° to 35°. The pressure side includes a tip shelf.

19 Claims, 4 Drawing Sheets

(56) References Cited

U.S. PATENT DOCUMENTS

| | | | | |
|---|---|---|---|---|
| 5,524,341 A * | 6/1996 | Ferleger | | B21K 3/04 29/889.21 |
| 6,264,429 B1 * | 7/2001 | Koeller | | F01D 5/141 416/223 A |
| 6,382,913 B1 * | 5/2002 | Lee | | F01D 5/141 416/92 |
| 6,457,938 B1 * | 10/2002 | Liu | | F01D 5/141 415/148 |
| 6,932,571 B2 * | 8/2005 | Cunha | | F01D 5/18 416/97 R |
| 8,092,179 B2 * | 1/2012 | Paauwe | | F01D 5/186 415/115 |
| 8,360,731 B2 | 1/2013 | Nash et al. | | |
| 8,747,072 B2 * | 6/2014 | Micheli | | F01D 5/141 416/238 |
| 2010/0303625 A1 * | 12/2010 | Kuhne | | F01D 5/20 416/91 |
| 2011/0135482 A1 * | 6/2011 | Nash | | F01D 5/141 416/223 A |
| 2013/0266454 A1 | 10/2013 | Mongillo, Jr. et al. | | |
| 2013/0280029 A1 * | 10/2013 | Lee | | F01D 5/00 415/1 |
| 2013/0302162 A1 | 11/2013 | Nash et al. | | |
| 2014/0165592 A1 * | 6/2014 | Key | | F01D 5/141 60/805 |
| 2014/0241899 A1 * | 8/2014 | Marini | | F01D 5/20 416/236 R |
| 2015/0292334 A1 * | 10/2015 | Mongillo, Jr. | | F01D 5/20 416/97 R |
| 2016/0298463 A1 * | 10/2016 | Auxier | | F01D 5/186 |
| 2018/0216825 A1 * | 8/2018 | Patel | | F23R 3/005 |

OTHER PUBLICATIONS

European Search Report for European Application No. 18164416.2 dated Aug. 3, 2018.

* cited by examiner

TURBINE BLADE WITH TIP VORTEX CONTROL AND TIP SHELF

BACKGROUND

This disclosure relates to a turbine blade that incorporates tip vortex control geometry with a relatively straight tip along a chord-wise direction.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor section and the fan section.

A turbine blade in the turbine section extends radially from a rotor to a tip, which must seal with respect to a blade outer air seal to ensure efficient operation of the turbine section. Airflow leaking past the tip can introduce vortices, which can reduce airflow efficiency through the turbine stage. A variety of strategies may be used to reduce the undesired vortices, such as the approach set forth in U.S. Pat. No. 8,360,731, which describes a change in rate of in airfoil stagger angle.

While turbine blades may incorporate geometries intended to mitigate inefficiencies, new challenges may be introduced and/or design challenges may still be encountered relating to airflow control around the blade.

SUMMARY

In one exemplary embodiment, a blade for a gas turbine engine includes an airfoil which includes pressure and suction side surfaces joined at leading and trailing edges to provide an exterior airfoil surface. The airfoil extends from a 0% span position to a 100% span position at a tip. A mean chamber line is provided at the tip and extends from the leading edge to the trailing edge. The mean chamber line has a leading edge tangent line at the leading edge at the tip and a trailing edge tangent line at the trailing edge at the tip. The leading edge tangent line and the trailing edge tangent line intersect to provide a total camber angle in a range of −35° to 35°. The pressure side includes a tip shelf.

In a further embodiment of any of the above, the tip shelf wraps around the leading edge and includes cooling holes.

In a further embodiment of any of the above, the cooling holes include a forward-most hole nearest the leading edge. The forward-most hole is arranged aft of the leading edge.

In a further embodiment of any of the above, the airfoil includes a stagnation point at the tip shelf aft of the leading edge on the pressure side. The forward-most hole is arranged between the leading edge and the stagnation point.

In a further embodiment of any of the above, the tip shelf includes a shelf radius near the leading edge. The leading edge includes a leading edge radius. The tip shelf extends back from the leading edge along a convex side of the airfoil to at least the tangency point of the leading edge radius to a tangency of the shelf radius and the intersection with the convex surface.

In a further embodiment of any of the above, the tip includes a squealer pocket. The squealer pocket includes purge holes.

In a further embodiment of any of the above, the 100% span position includes a maximum thickness provided at a region beginning 20% from the leading edge and ending 20% from the trailing edge in a chord-wise direction.

In a further embodiment of any of the above, the airfoil has a maximum true chord length at the 100% span location.

In a further embodiment of any of the above, the leading edge includes a leading edge radius at a base of the tip shelf. The tip includes a shelf radius at the 100% span location near the leading edge. The leading edge radius and the shelf radius are within 50% of one another.

In a further embodiment of any of the above, the airfoil has a stagger angle that changes from the 0% span position to the 100% span position. A base region is disposed adjacent to the attachment, a tip region, and a transition region located between the base and the tip regions. A rate of the change of the stagger angle in the transition region is greater than a rate of the change of the stagger angle in the base region. The rate of the change of the stagger angle in the transition region is greater than a rate of change of the stagger angle in the tip region. The airfoil has a true chord that increases as the airfoil extends from the base region to the tip.

In a further embodiment of any of the above, the tip region has a substantially more planar pressure side surface than a root pressure side surface.

In a further embodiment of any of the above, the tip region has a chord line and a pressure side surface. The chord line at the tip is more parallel to the pressure side surface at the tip than a root chord line is to a root pressure side surface.

In a further embodiment of any of the above, the true chord increases as the airfoil extends from the 0% span position to the tip.

In a further embodiment of any of the above, the true chord changes as the airfoil extends between the 0% span position and the tip. A rate of change of the true chord in the transition region is greater than a rate of change of the true chord in the base region. The rate of change of the true chord in the transition region is greater than a rate of change of the true chord in the tip region.

In a further embodiment of any of the above, the true chord of the airfoil increase from the base region to the tip region.

In a further embodiment of any of the above, a max rate of change of the true chord occurs between 25% and 85% span.

In a further embodiment of any of the above, the tip shelf wraps about the leading edge to both the pressure and suction sides. An airflow from the tip shelf is configured to extend downward and along the suction side on one end.

In a further embodiment of any of the above, the tip shelf extends to the trailing edge on another end.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
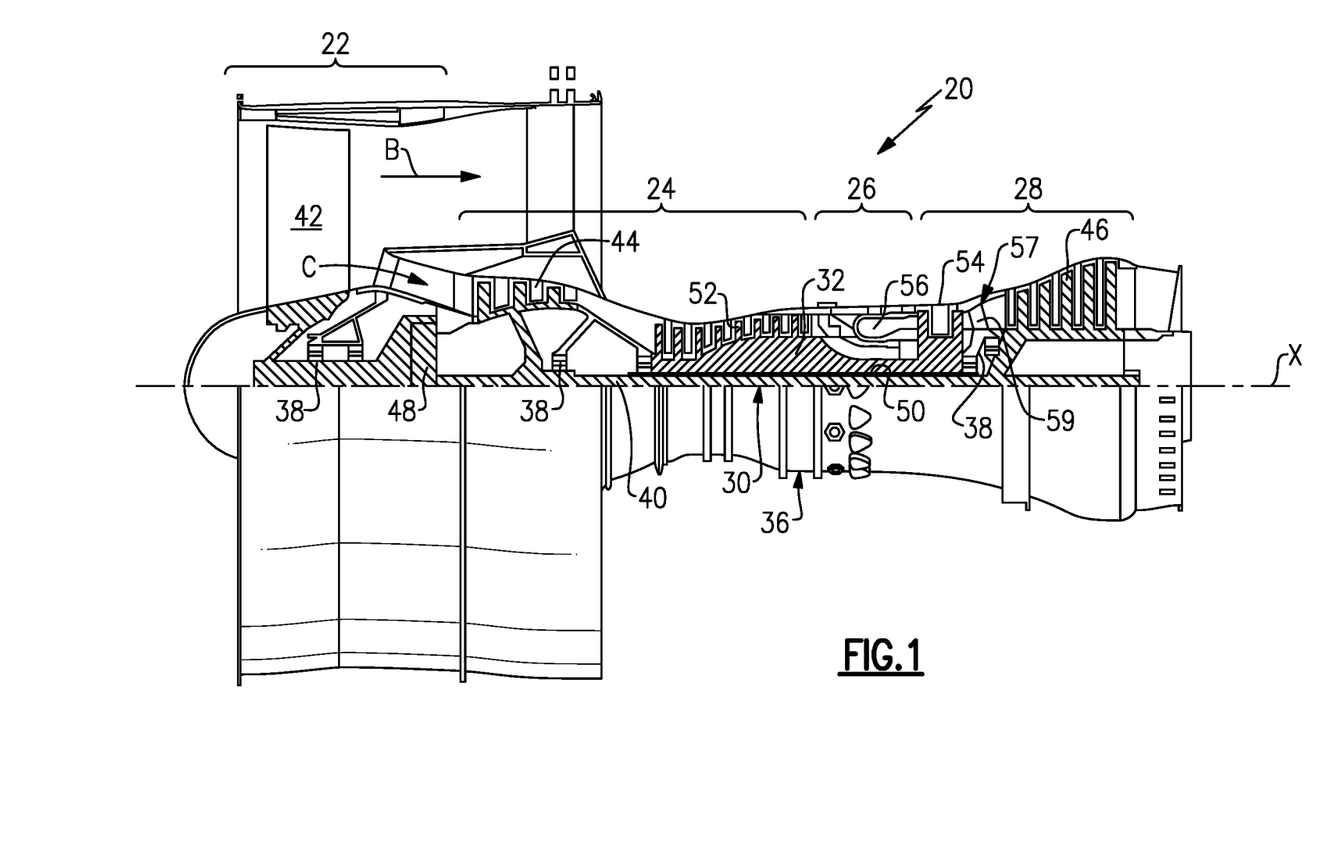
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/(518.7° R)]$^{0.5}$. The "Low corrected fan tip speed", as disclosed herein according to one non-limiting embodiment, is less than about 1150 ft/second.

Figure 2A:
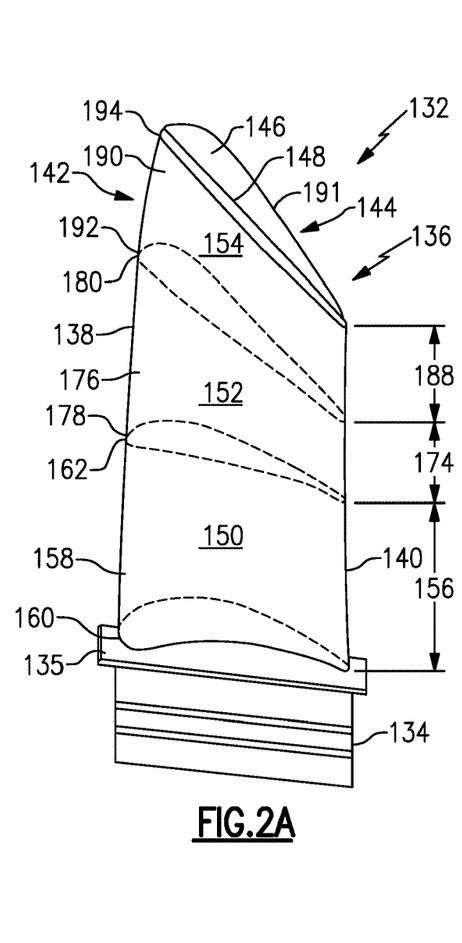
FIG. 2A is a perspective view of a blade for the gas turbine engine shown in FIG. 1.

FIG. 2A is a diagrammatic illustration of one embodiment of a blade 132 for use in the turbine section 28 of the gas turbine engine 20. The blade 132 includes an attachment 134, a platform 135, and an airfoil 136. Some embodiments of the blade 132 do not include the platform 135. To simplify the description herein, the attachment 134 may be considered as including the platform 135 for purposes of defining the beginning of the airfoil 136, which corresponds to a 0% span position at an inner flow path surface of the core flow path. The blade attachment 134 is adapted to be received within a slot disposed within a rotor disk, for example. A circumferential array of blades arranged in a circumferential direction Y provide a stage in the turbine section. Blade attachments are well known in the art, and the disclosed blade is not limited to any particular attachment configuration.

Figure 2B:
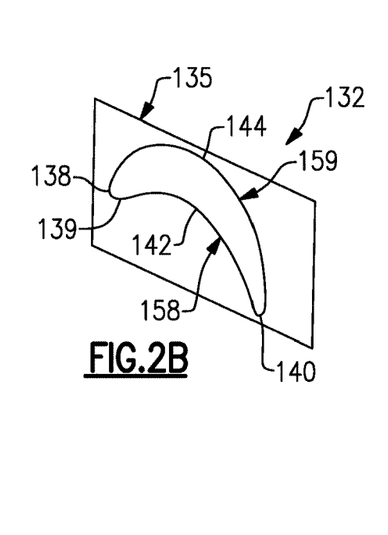
FIG. 2B is a plan view of the airfoil illustrating directional references.
Figure 3:
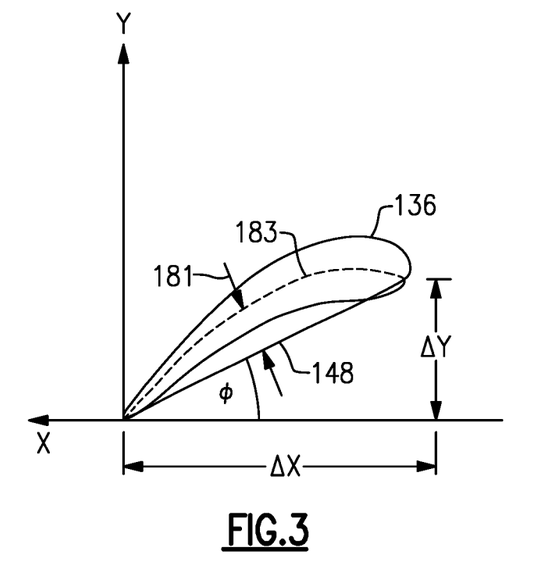
FIG. 3 is a diagrammatic illustration of a cross-sectional slice of an airfoil.
Figure 4:
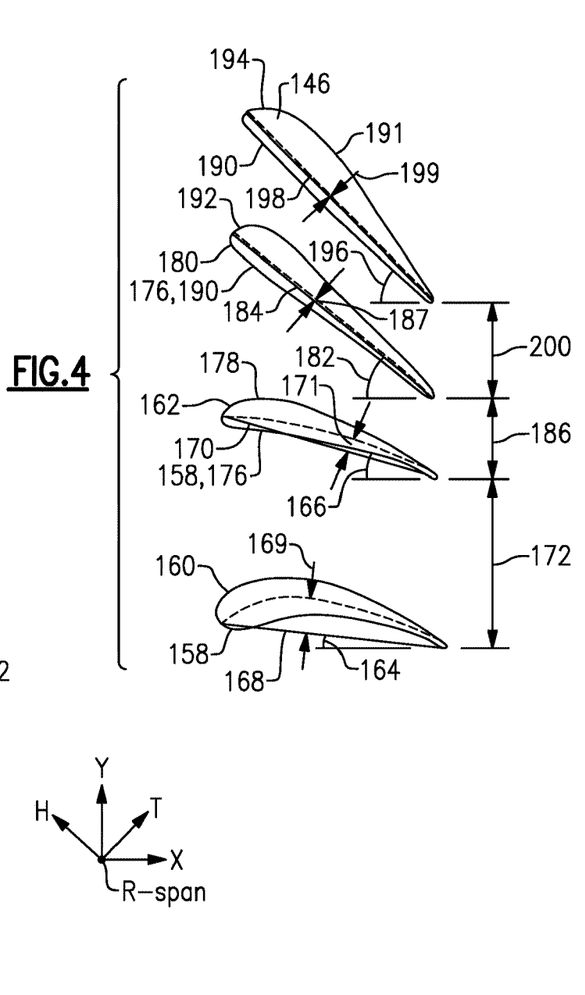
FIG. 4 is a diagrammatic illustration of cross-sectional slices of an airfoil.

The airfoil 136 has a leading edge 138, a trailing edge 140, a pressure side 142, a suction side 144, a stagger angle φ, a chord and a camber line. The stagger angle φ changes as the airfoil 136 extends between the 0% span position and a 100% span position at a tip 146 (e.g., the stagger angle increases in a direction defined by a line that starts at the start of the airfoil 136 and travels along the span of the airfoil 136 toward the tip 146). The tip 146 typically is arranged adjacent to a blade outer air seal (not shown). Referring to FIG. 3, the stagger angle φ is defined as the angle between a chord line 148 of the airfoil 136 and an axis (e.g., the longitudinally extending axis X of the gas turbine engine 20, etc.). Therefore, the stagger angle φ for one cross-sectional "slice" of the airfoil 136 may be calculated using the following equation:

$$\varphi_{stagger} = \tan^{-1}(\Delta y / \Delta x)$$

where Δy is indicative of a distance between tips of the leading and the trailing edges 138, 140 of the airfoil 136 in the circumferential direction and along a y-axis, and Δx is indicative of a distance between the tips of the leading and the trailing edges 138, 140 of the airfoil 136 along the x-axis. Additionally, or alternatively, the true chord of the airfoil 136, which extends linearly from the leading edge 138 to the trailing edge 140 in a chord-wise direction H shown in FIG. 2B, changes as the airfoil 136 extends between the start of the airfoil 136 and the tip 146; e.g., the airfoil true chord increases in a radial direction, as can be appreciated from FIG. 4.

Referring again to FIG. 2A, the airfoil 136 includes a base region 150, a transition region 152 and a tip region 154. The base region 150 has a base height 156, a pressure side surface 158, and a suction side surface 159, as shown in FIG. 2B. The base height 156 extends between a first end 160 (also referred to as a "root") and a second end 162. The root 160 is located at a cross-sectional "slice" of the airfoil 136 where the base region 150 abuts the attachment 134 at the 0% span position. The second end 162 is located at a cross-sectional "slice" of the airfoil 136 where the base region 150 abuts the transition region 152. In some embodiments, the base height 156 is approximately 50% of the span of the airfoil 136. The root 160 and the second end 162 each have a stagger angle 164, 166, a true chord 168, 170 and camber 169, 171.

Referring to the embodiment in FIG. 4, the airfoil stagger angle φ increases within the base region 150 in a direction defined by a line 172 that starts at the root 160 and travels toward the second end 162; i.e., the stagger angle 166 at the second end 162 is greater than the stagger angle 164 at the root 160. Additionally, or alternatively, the airfoil true chord increases within the base region 150 in a direction defined by the line 172 that starts at the root 160 and travels toward the second end 162; i.e., the true chord 170 at the second end 162 is greater than the true chord 168 at the root 160. One or both the stagger angle rate of change and the true chord rate of change within the base region 150 may be constant or may vary. Where either one of the stagger angle φ and the true chord rates of change vary, an average stagger angle rate of change and/or an average true chord rate of change may be used to respectively define the above referenced rates of change within the base region 150. The pressure and suction side surfaces 158, 159 are joined at leading and trailing edges 138, 140 and together provide an exterior airfoil surface. In some embodiments, the base region 150 additionally has non-uniform camber. Referring to FIG. 3, camber can be defined as a rise 181 (e.g., distance) between a camber line 183 and a chord line 148. For example, referring to the embodiment in FIG. 4, the camber of the base region 150 can decrease in the direction defined by the line 172 such that camber 169 of the root 160 is greater than the camber 171 of the second end 162.

Referring to FIG. 2A, the transition region 152 has a transition height 174, a pressure side surface 176 and a suction side surface (not shown). The transition height 174 extends between a first end 178 and a second end 180. The first end 178 is located at the same cross-sectional "slice" of the airfoil 136 as the second end 162 of the base region 150. The second end 180 is located at a cross-sectional "slice" of the airfoil 136 where the transition region 152 abuts the tip region 154. In some embodiments, the transition region 152 is approximately 25% of the span of the airfoil 136. The first end 178 and the second end 180 each have a stagger angle 166, 182, a true chord 170, 184 and camber 171, 187. Referring to FIG. 4, the airfoil stagger angle increases within the transition region 152 in a direction defined by a line 186 that starts at the first end 178 and travels towards the second end 180; i.e., the stagger angle 182 at the second end 180 is greater than the stagger angle 166 at the first end 178. Additionally or alternatively, the airfoil chord increases within the transition region 152 in a direction defined by the line 186 that starts at the first end 178 and travels toward the second end 180; i.e., the true chord 184 at the second end 180 is greater than the true chord 170 at the first end 178. One or both of the stagger angle rate of change and the true chord rate of change within the transition region 152 may be constant or may vary. Where either one or both of the stagger angle and true chord rates of change vary, an average stagger angle rate of change and/or an average true chord rate of change may be used to respectively define the above referenced rates of change within the transition region 152. In some embodiments, the transition region 152 additionally has non-uniform camber. For example, the camber of the transition region 152 can decrease in the direction defined by the line 186 such that the camber 171 of the first end 178 is greater than the camber 187 of the second end 180.

Referring to FIG. 2A, the tip region 154 has a tip height 188, a pressure side surface 190 and a suction side surface 191. The tip height 188 extends between a first end 192 and a second end 194 (i.e., the tip 146 of the airfoil 136). The first end 192 is located at the same cross-section "slice" of the airfoil 136 as the second end 180 of the transition region 152. In some embodiments, the tip region 154 is approximately 20-25% of the span of the airfoil 136. The first end 192 and the second end 194 each have a stagger angle 182, 196, a chord 184, 198, and camber 87, 199. Referring to FIG. 4, the airfoil stagger angle increases within the tip region 154 in a direction defined by a line 200 that starts at the first end 192 and travels towards the second end 194; i.e., the stagger angle 196 at the second end 194 is greater than the stagger angle 182 at the first end 192. Additionally or alternatively, the airfoil true chord increases within the tip region 154 in a direction defined by the line 200 that starts at the first end 192 and travels towards the second end 194; i.e., the true chord 198 at the second end 194 is greater than the true chord 184 at the first end 192. Notably, one or both of the stagger angle rate of change and the true chord rate of change within the tip region 154 may be constant or may vary. Where either one or both of the stagger angle and true chord rates of change vary, an average stagger angle rate of change and/or an average true chord rate of change may be used to respectively define the above referenced rates of change within the tip region 154. For example, in one embodiment, a chord line (e.g., the chordline 184, 198) of the tip region 154 is substantially parallel to the pressure side surface 190 between the first and the second ends 192, 194. The suction side surface 191 is generally convex. In some embodiments, the tip region 154 has substantially uniform camber. For example, the camber 187 of the first end 192 may be substantially equal to the camber 199 of the second end 194. The airfoil 136 has a maximum true chord length at the 100% span location. The airfoil pressure surface local radius of curvature transitions as a function of airfoil radial span, which results in a variable pressure side surface ranging from a predominately concave curvature at the root airfoil root region 150, transitioning to a linear or planar surface at the mid span airfoil region 174, and then transitioning to a predominately convex surface curvature at the airfoil tip region 177.

Referring to FIG. 2A, the base region 150 is disposed adjacent to the attachment 134. The transition region 152 is located between the base and the tip regions 150, 154. Referring to the embodiment in FIG. 4, the airfoil 136 (i.e., the base, transition and tip regions 150, 152, 154) is configured such that the stagger angle rate of change for the transition region 152 is greater than the stagger angle rates of change for the base and the tip regions 150, 154, respectively. The airfoil 136 is additionally, or alternatively, configured such that the true chord rate of change for the transition region 152 is greater than the true chord rates of change for the base and the tip regions 150, 154, respectively.

Figure 5A:
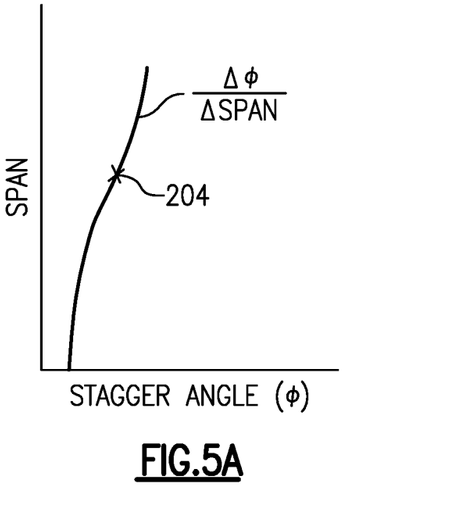
FIG. 5A is a graph illustrating stagger angle rates of change of the airfoil between an attachment and a tip.
Figure 5B:
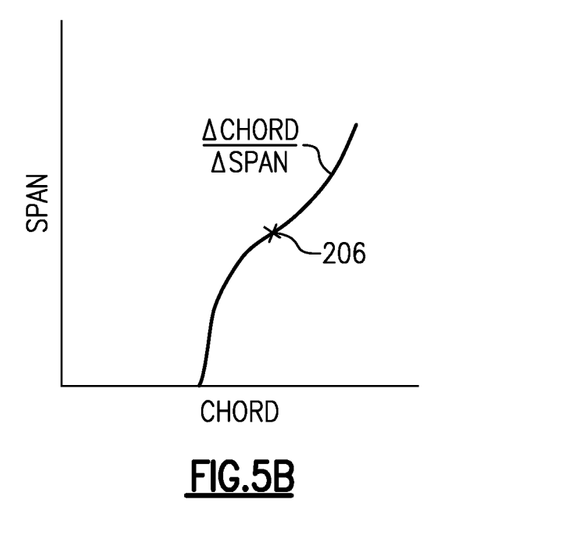
FIG. 5B is a graph illustrating chord rates of change of the airfoil between the attachment and the tip.

FIG. 5A is a graph illustrating the stagger angle rates of change (i.e., Δφ/Δ(span)) of the airfoil 136 between the attachment 134 and the tip 146. The horizontal axis represents the stagger angle φ and the vertical axis represents a distance along the span of the airfoil 136. FIG. 5B is a graph illustrating the true chord rates of change (i.e., Δ(chord)/Δ(span)) of the airfoil 136 between the attachment 134 and the tip 146. The horizontal axis represents the true chord and the vertical axis represents a distance along the span of the airfoil 136. As illustrated in FIGS. 5A and 5B, the transition region 152 has a point of inflection 204, 206 where the curvatures of the lines change from a negative value to a positive value. It is understood that this inflection permits the base and the tip regions 150, 154 to have relatively independent airflow characteristics. That is, for example, the airfoil 136 may be configured such that the base region 150 utilizes typical airflow characteristics, while the tip region 154 utilizes airflow characteristics designed to reduce flow disturbances induced by a leakage airflow. The airflow characteristics of the tip region 154 will be described below in further detail.

Figure 6:
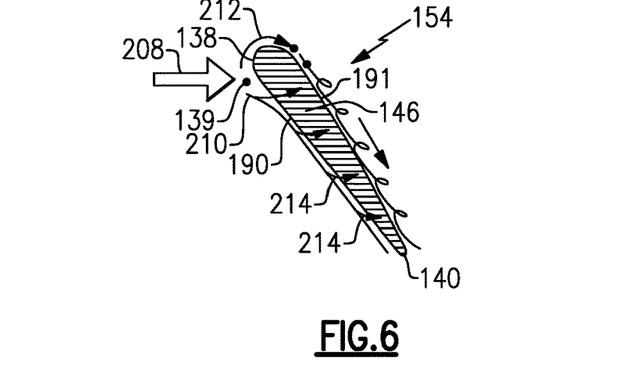
FIG. 6 is a diagrammatic illustration of airflow characteristics of a tip region of the airfoil in FIGS. 2 and 4.

FIG. 6 is a diagrammatic illustration of the tip region 154 of the airfoil 136 in FIGS. 2 and 4. Referring to FIG. 6, in operation, a stagnation point 139 forms within an airflow 208 adjacent the pressure side surface 190 of the tip region 154 proximate the leading edge 138. As set forth above, a stagnation point may be defined as a point in a flow field where velocity of the airflow is approximately zero. At the stagnation point 139, the airflow 208 is divided into a pressure side airflow 210 and a suction side airflow 212.

The pressure side airflow 210 is directed, parallel to the pressure side surface 190, from the stagnation point 139 towards the trailing edge 140. As the pressure side airflow 210 travels towards the trailing edge 140, a portion thereof (i.e., a leakage airflow 214) migrates over the tip 146 of the airfoil 136 from the pressure side airflow 210 to the suction side airflow 212.

The leakage airflow 214 reduces the efficiency of the turbine via the unrealized work extraction that the leakage air represents and also through increased mixing losses as the leakage air is reintroduced with the mainstream suction side flow. The leakage airflow and the manner in which it mixes upon exiting the tip gap on the suction side are a function of the local pressure distribution around the blade tip. In contrast to prior art blades which aim to reduce the tip leakage, the disclosed blade does not alter the amount of leakage flow. In contrast, it alters the local pressure distribution to one more favorable for reducing the leakage mixing loss. This substantial reduction in mixing loss leads to a higher efficiency turbine.

Figure 7:
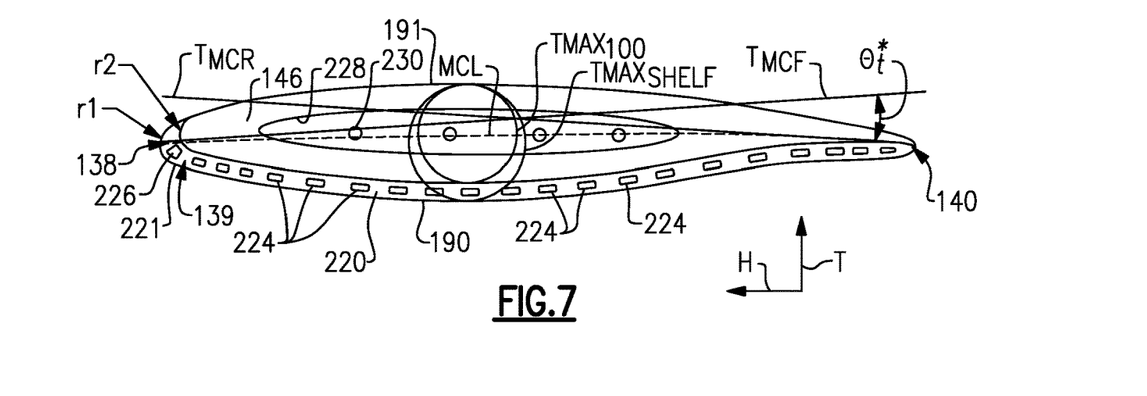
FIG. 7 is a plan view of a tip of the airfoil shown in FIG. 6.

Notwithstanding the tip vortex control features used in the turbine blade described above, additional airflow control enhancements may be needed. Referring to FIG. 7, a mean camber line MCL is provided at the tip 146 and extends from the leading edge 138 to the trailing edge 140, as described in U.S. Pat. No. 4,431,376, which is incorporated herein by reference in its entirety. The mean camber line MCL has a leading edge tangent line $T_{MCF}$ at the leading edge 138 at the tip 146 and a trailing edge tangent line $T_{MCF}$ at the trailing edge 140 at the tip 146. The leading edge tangent line $T_{MCF}$ and the trailing edge tangent line TMCR intersect to provide a total camber angle $\theta_t^*$ in a range of −35° to 35°, which provides a relatively straight tip along the chord-wise direction H. In another example, the total camber angle $\theta_t^*$ is in a range of −30° to 30°, and in another example, the total camber angle $\theta_t^*$ is in a range of −25° to 25°.

The tip 146 includes a tip shelf 220 arranged on the pressure side surface 190 that extends from the trailing edge 140 and wraps around the leading edge 138 to the suction side surface 191. It should be understood that the tip shelf 220 may not wrap around the leading edge 138 and/or not fully extend to the trailing edge 140.

Figure 8:
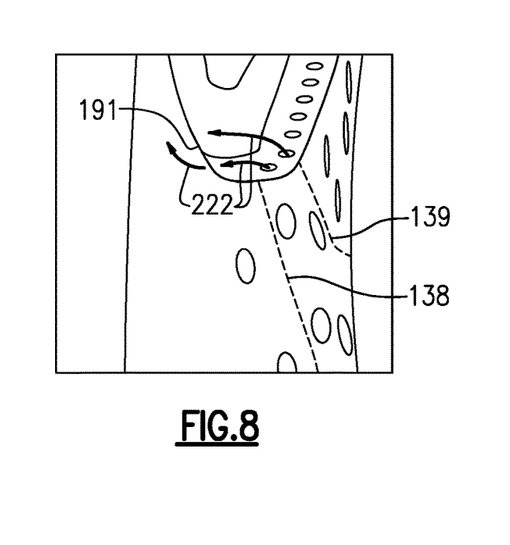
FIG. 8 is a perspective view of the tip shown in FIG. 7 illustrating airflow from a tip shelf.

In the example, the tip shelf 220 includes cooling holes 224, which may be any suitable shape, in fluid connection with an internal cooling passage, as is known in the turbine blade art. In one example, the width of the tip shelf 220 is at least three times a diameter of the cooling holes 224, which in one example is 0.014 inch (0.36 mm), and in another example, the width is in a range of 1-4 hydraulic diameters of the cooling hole 224, where the hydraulic diameter is 4A/P (A=hole area, P=hole perimeter). The cooling holes 224 include a forward-most hole 226 nearest the leading edge 138. In one example, the forward-most hole 226 is arranged aft of the leading edge 138, for example, between the leading edge 138 and the stagnation point 139. In this position sufficient airflow may be provided to achieve desired cooling at the tip 146. For example, wrapping the leading edge 138 with the tip shelf 220 and placing the forward-most hole 226 as shown may encourage airfoil (flow lines 222 in FIG. 8) to extend downward and along the suction side surface 191 to provide improved cooling at the tip 146 near the leading edge 138.

The leading edge 138 includes a leading edge radius r1 at a base 221 of the tip shelf 220. The tip 146 includes a shelf radius r2 at the 100% span location near the leading edge 138. The leading edge radius r1 and the shelf radius r2 any may be within 50% of one another.

Figure 9:
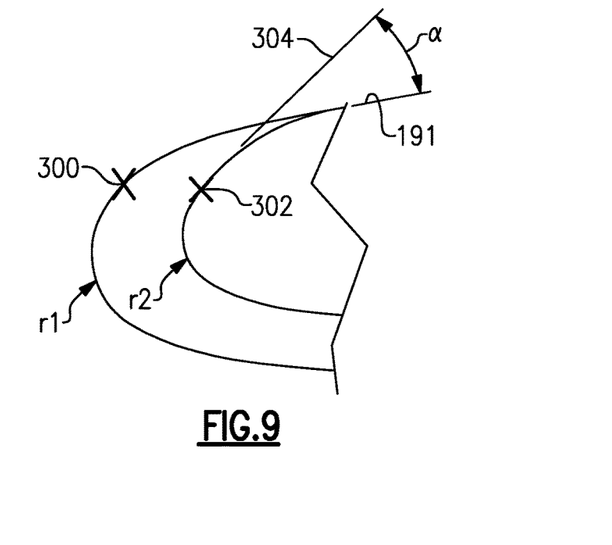
FIG. 9 is an enlarged view of a portion of the airfoil tip shown in FIG. 7.

The axial extent of the wrapping of the tip shelf 220 about the leading edge 138 toward the convex side of the airfoil is a function of the leading edge radius r1 and the shelf radius r2, and the width of the shelf. The leading edge tip shelf may extend back from the leading edge 138 along the convex surface at least to a tangency point 300 of the leading edge r1 and may extend axially to a tangency point 302 of the shelf radius r2 and the intersection with the suction side surface 191, as shown in FIG. 9. A tangent line 304 from tangency point 302 is at an angle α, which is a range of 0°-60°, from the suction side surface 191.

Unlike one type of conventional turbine blade, the airfoil 136 includes a maximum thickness in a thickness direction T (FIG. 2B) at the 100% span position at a region beginning 20% from the leading edge 138 and ending 20% from the trailing edge 140 in a chord-wise direction H as shown in FIG. 7. For example, the maximum thickness $TMAX_{100}$ at the 100% span position is at the center third in the chord-wise direction H, as is the maximum thickness $TMAX_{shelf}$ at a span position that includes the tip shelf 220.

A squealer pocket 228 may be provided on the tip 146 and may include one or more purge holes 230. The squealer pocket 228 and/or purge holes 230 may be omitted if desired.

It should also be understood that although a particular component arrangement is disclosed in the illustrated embodiment, other arrangements will benefit herefrom. Although particular aerodynamic airfoil geometric attributes and various airfoil tip cooling design step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A blade for a gas turbine engine, comprising:
    an airfoil extending from an attachment and including pressure and suction side surfaces joined at leading and trailing edges to provide an exterior airfoil surface, the airfoil extending from a 0% span position to a 100% span position at a tip, a mean camber line is provided at the tip and extends from the leading edge to the trailing edge, the mean camber line has a leading edge tangent line at the leading edge and at the tip and a trailing edge tangent line at the trailing edge and at the tip, the leading edge tangent line and the trailing edge tangent line intersect to provide a total camber angle in a range of −35° to 35°, wherein the pressure side includes a tip shelf that wraps around the leading edge and includes cooling holes;
    wherein the airfoil has a stagger angle that changes from the 0% span position to the 100% span position, a base region disposed adjacent to the attachment, a tip region, and a transition region located between the base and the tip regions, wherein a rate of the change of the stagger angle in the transition region is greater than a rate of the change of the stagger angle in the base region, wherein the rate of the change of the stagger angle in the transition region is greater than a rate of change of the stagger angle in the tip region, and wherein the airfoil has a true chord that increases as the airfoil extends from the base region to the tip;
    wherein the airfoil has a stagger angle rates of change between the attachment and the tip represented by a first curvilinear relationship, and the airfoil has a true chord rates of change between the attachment and the tip represented by a second curvilinear relationship, the transition region has a first point of inflection where the first curvilinear relationship changes from a negative value to a positive value, and the transition region has a second point of inflection where the second curvilinear relationship changes from a negative value to a positive value;
    wherein the tip includes a squealer pocket, and the squealer pocket includes purge holes, and the 100% span position includes a maximum thickness provided at a region beginning 20% from the leading edge and ending 20% from the trailing edge in a chord-wise direction; and
    wherein the cooling holes in the tip shelf have a hydraulic diameter and the tip shelf has a width, wherein the width is between 1 and 4 times the hydraulic diameter.

2. The blade of claim 1, wherein the cooling holes include a forward-most hole in the tip shelf nearest the leading edge, the forward-most hole arranged aft of the leading edge, wherein an airflow from the forward-most hole is configured to extend downward from the tip and along the suction side on one end.

3. The blade of claim 2, wherein the airfoil includes a stagnation point at the tip shelf aft of the leading edge on the pressure side, the forward-most hole arranged between the leading edge and the stagnation point.

4. The blade of claim 1, wherein the tip shelf includes a shelf radius near the leading edge, and the leading edge includes a leading edge radius, the tip shelf extends back from the leading edge along a convex surface of the airfoil to at least the tangency point of the leading edge radius to a tangency of the shelf radius and the intersection with the convex surface.

5. The blade of claim 1, wherein the airfoil has a maximum true chord length at the 100% span location.

6. The blade of claim 1, wherein the leading edge includes a leading edge radius at a base of the tip shelf, and the tip includes a shelf radius at the 100% span location near the leading edge, the leading edge radius and the shelf radius are within 50% of one another.

7. The blade of claim 1, wherein the tip region has a substantially more planar pressure side surface than a root pressure side surface.

8. The blade of claim 1, wherein the tip region has a chord line and a pressure side surface, and wherein the chord line at the tip is more parallel to the pressure side surface at the tip than a root chord line is to a root pressure side surface.

9. The blade of claim 8, wherein the true chord increases as the airfoil extends from the 0% span position to the tip.

10. The blade of claim 8, wherein the true chord changes as the airfoil extends between the 0% span position and the tip, wherein a rate of change of the true chord in the transition region is greater than a rate of change of the true chord in the base region, and wherein the rate of change of the true chord in the transition region is greater than a rate of change of the true chord in the tip region.

11. The blade of claim 10, wherein the true chord of the airfoil increases from the base region to the tip region.

12. The blade of claim 8, wherein a maximum rate of change of the true chord occurs between 25% and 85% span.

13. The blade of claim 1, wherein the tip shelf wraps about the leading edge to both the pressure and suction sides.

14. The blade of claim 13, wherein the tip shelf extends to the trailing edge on another end.

15. The blade of claim 13, wherein the width is at least three times the hydraulic diameter.

16. The blade of claim 15, wherein the width is less than four times the hydraulic diameter.

17. The blade of claim 1, wherein the airfoil is a turbine blade.

18. The blade of claim 1, wherein the maximum thickness at the 100% span position is at a center third in the chord-wise direction.

19. The blade of claim 18, wherein the tip shelf has a maximum tip shelf thickness, and the maximum tip shelf thickness is at the center third in the chord-wise direction.

* * * * *